United States Patent [19]

Stone

[11] Patent Number: 5,048,142
[45] Date of Patent: Sep. 17, 1991

[54] ELECTROMAGNETIC TAPE CLEANER

[76] Inventor: George Stone, 315 W. Main, Pierce, Nebr. 68767

[21] Appl. No.: 509,303

[22] Filed: Apr. 16, 1990

[51] Int. Cl.$^5$ .............................................. B08B 11/02
[52] U.S. Cl. ..................................... 15/97.1; 15/100; 360/137
[58] Field of Search ........................ 15/97.1, 100, 102; 134/9; 360/128, 137

[56] References Cited

U.S. PATENT DOCUMENTS

| | | | |
|---|---|---|---|
| 4,324,014 | 4/1982 | Stutz, Jr. et al. | 15/97.1 |
| 4,637,088 | 1/1987 | Badaracco et al. | 15/97.1 |
| 4,713,857 | 12/1987 | Cecil et al. | 15/97.1 |

Primary Examiner—Edward L. Roberts
Attorney, Agent, or Firm—John A. Beehner

[57] ABSTRACT

An apparatus for cleaning electromagnetic tape wound onto dual reels of a tape cartridge is disclosed. A housing is provided having a pair of spindles rotatably supported thereon for receiving respective reels of a tape cartridge. A drive mechanism is drivingly connected to one of the spindles for causing the tape to be transferred from one reel to the other. A first absorbent pad is supported on the housing for wiping engagement with one side of the tape and a cleaner post carrier is supported on the housing for movement between a cleaning position adjacent the first pad and a loading position spaced from the first pad. The cleaner post has opposite first and second cleaner surfaces and is removably and reversably mounted on the carrier such that one surface faces the first pad. A cleaning fluid reservoir is mounted on the housing and in communication with at least the first pad.

11 Claims, 6 Drawing Sheets

ELECTROMAGNETIC TAPE CLEANER

BACKGROUND OF THE INVENTION

The present invention is directed generally to an apparatus for cleaning electromagnetic tapes and more particularly to an apparatus for cleaning magnetic media tapes of the type used to record and play video or audio signals, wherein the tape is moved continuously between a pair of pads saturated with a cleaning solution, at least one of the pads being reversible and removable for prolonged efficient usage.

A significant problem associated with a video cassette recorder (VCR) is the extremely small gap in the recording and playing heads. Any foreign substance on the surface of the tape will plug this gap and render the VCR unplayable. A single fingerprint is usually enough to cause a problem. A film of airborne smoke or grease which may accumulate on the tape when not in use is another problem.

It is common for members of a household to accumulate a substantial number of recorded VHS tapes of movies, educational materials and home movies. Much of the collection may become unusable over time as foreign matter accumulates on the tapes naturally or by accidents. Such foreign matter may be the normal electrostatic dust that accumulates on almost everything, oxides that flake off the tape through normal usage, grease, oil, fingerprints, smoke food or even bugs. Video tape rental outlets experience greater problems relating to foreign matter on tapes due to more frequent usage and the lesser degree of care that some people may exercise for tapes that are not their own. Dirty tapes also result in excessive repair and cleaning of the VCR tape heads. Such heads are likely to require less frequent cleaning if only clean tapes are played.

Accordingly, a primary object of the invention is to provide an improved electromagnetic tape cleaner.

Another object is to provide such a tape cleaner wherein the tape is continuously run between a pair of soft pads saturated with a cleaning fluid, at least one pad being supported on a detachable and reversible post for prolonged efficient usage.

SUMMARY OF THE INVENTION

The electromagnetic tape cleaning apparatus of the invention includes a housing having a pair of spindles for receiving the respective reels of an electromagnetic tape cartridge and a power source drivingly connected to at least one of the spindles for causing tape to be transferred from one reel to the other. A first soft absorbent pad is supported on the housing for wiping engagement with one side of a tape in the cartridge and a second soft absorbent pad is arranged on opposite first and second cleaner surfaces of an upright post which is removably and reversibly mounted on a carrier for movement between a cleaning position adjacent the first pad and a loading position spaced further from the first pad. The housing has a cleaning fluid reservoir thereon adapted to be filled with a cleaning fluid for communication with at least the first pad for soaking it with fluid from the reservoir.

A second power source may be provided for advancing the cleaner post carrier from the loading position to the cleaning position whereby the tape on a cartridge loaded into the machine is sandwiched between the first and second soft absorbent pads. As the first power source advances the tape from one reel to the other, the tape is passed between the soaked pads for a cleaning and wiping action which removes foreign matter from the surfaces of the tape. Fluid tends to seep over the top of the tape for maintaining the second pad in a soaked condition throughout the cleaning operation.

The second pad is generally smaller than the first pad and may wear out after extensive use. To prolong the use of a single cleaner post, a second pad is provided on opposite first and second cleaning surfaces thereof. The cleaner post can simply be detached from the carrier, rotated one hundred eighty degrees and reinserted into the carrier to present the opposite second pad to the tape for continued operation.

A removable cover may be provided for the reservoir to minimize evaporation of cleaning fluid therefrom.

DESCRIPTION OF THE PREFERRED EMBODIMENT

Figure 7:
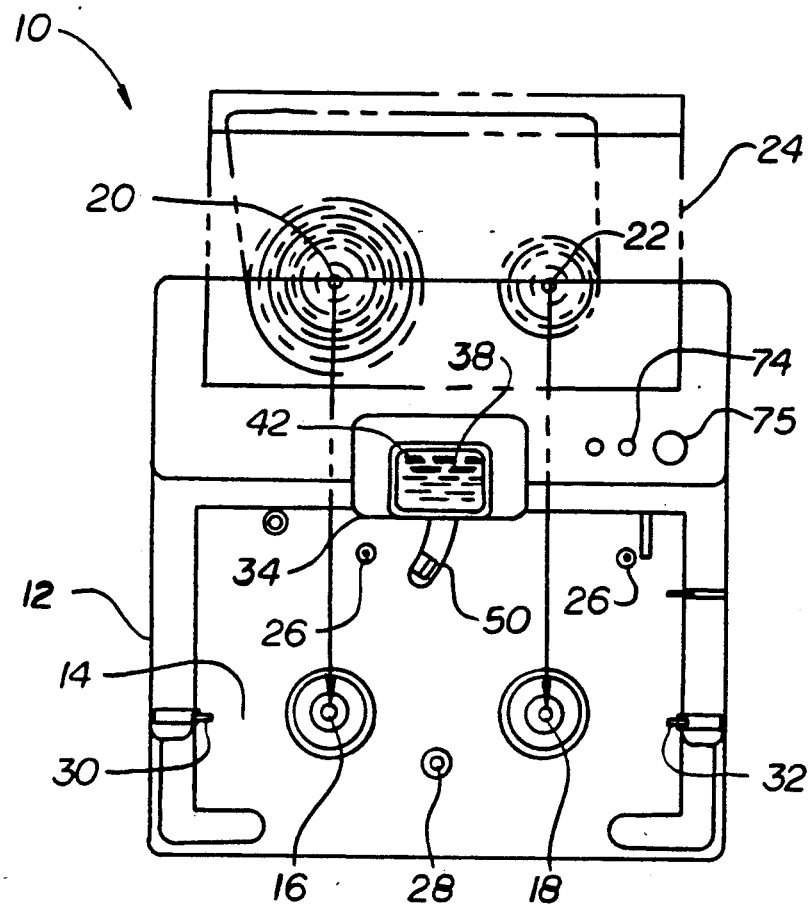
FIG. 7 is a partially exploded top planned view of the apparatus showing the placement of a VHS tape onto the apparatus.
Figure 8:
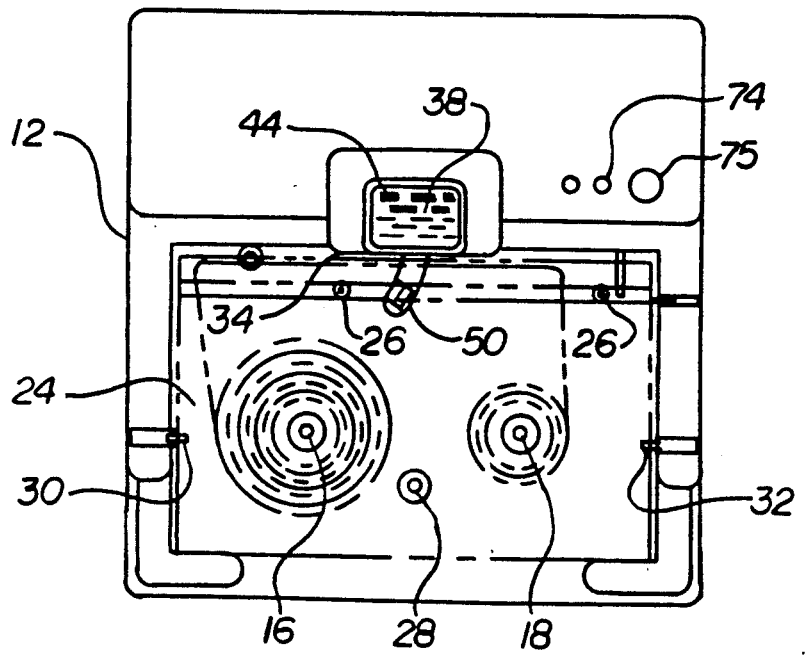
FIG. 8 is a top planned view showing the apparatus with a VHS tape cartridge installed thereon.

The electromagnetic tape cleaning apparatus 10 is shown in the drawings as including a housing 12 having a tape cartridge support surface 14 with a pair of opening registered with a pair of spindles 16 and 18. The spindles are rotatably supported on the housing at positions for receiving respective reels 20 and 22 (FIG. 7) of a VHS tape cartridge 24. Surface 14 is furthermore provided with appropriate guide pins 26 and 28 and cartridge hold down arms 30 and 32 which retain the cartridge 24 in place on the cleaning machine, yet which enable easy release and removal of the cartridge 24.

Figure 4:
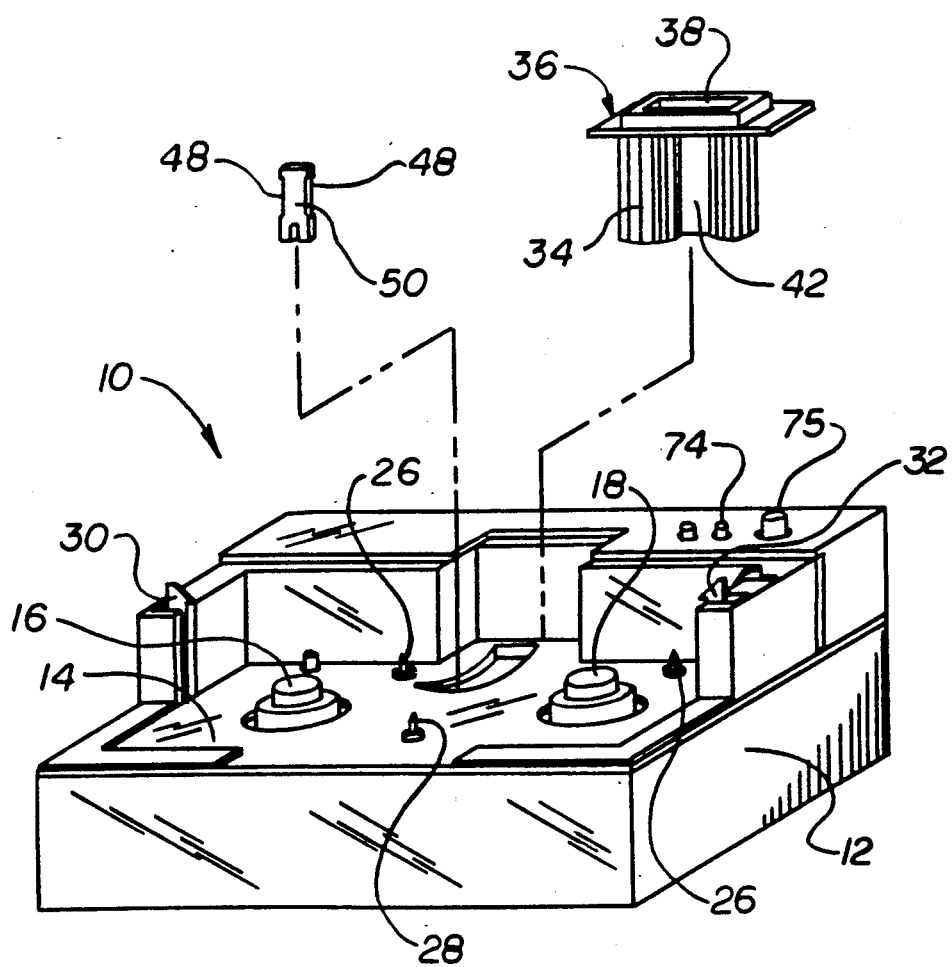
FIG. 4 is a perspective partially exploded view of the apparatus showing the fluid reservoir and the first and second pads removed from the machine.
Figure 5:
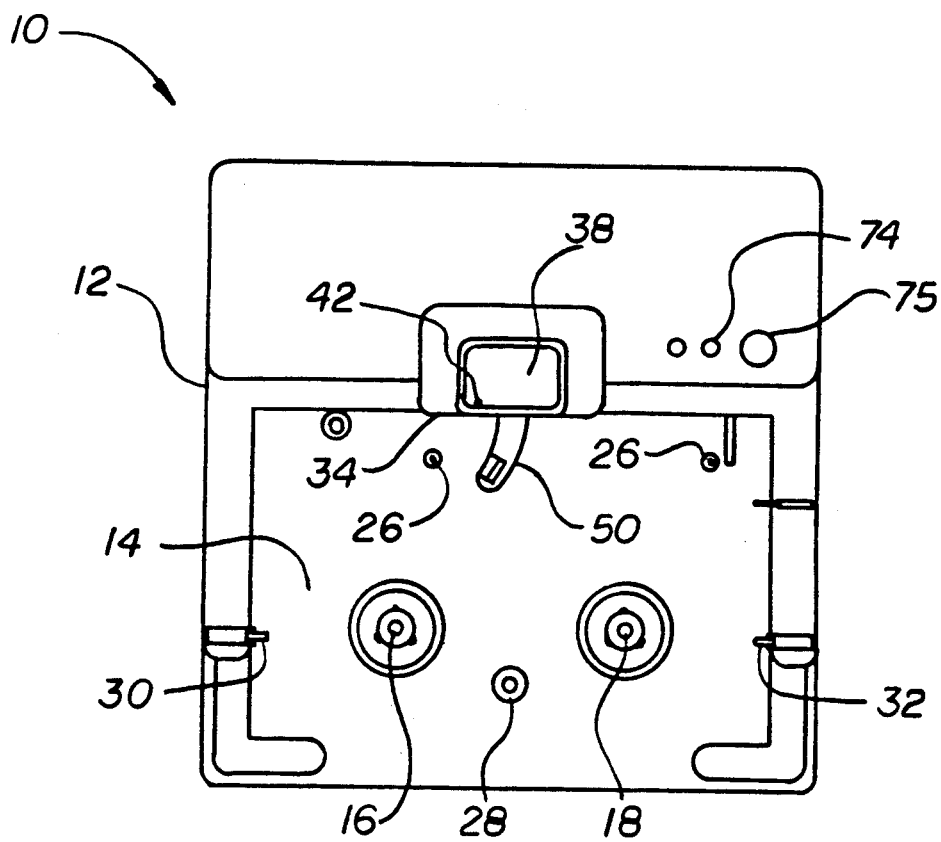
FIG. 5 is a top planned view of the apparatus.

A first soft absorbent pad 34 is supported on the housing at a position for wiping engagement with one side of a tape of an installed cartridge 24. As shown in FIG. 4, the first soft absorbent pad 34 is secured to the front surface of a removable element 36 which includes an open topped cleaning fluid reservoir 38 having a hole 40 through a forward portion thereof for communication of cleaning fluid with the first pad 34 secured onto the front surface of a pad support wall 42.

Figure 6:
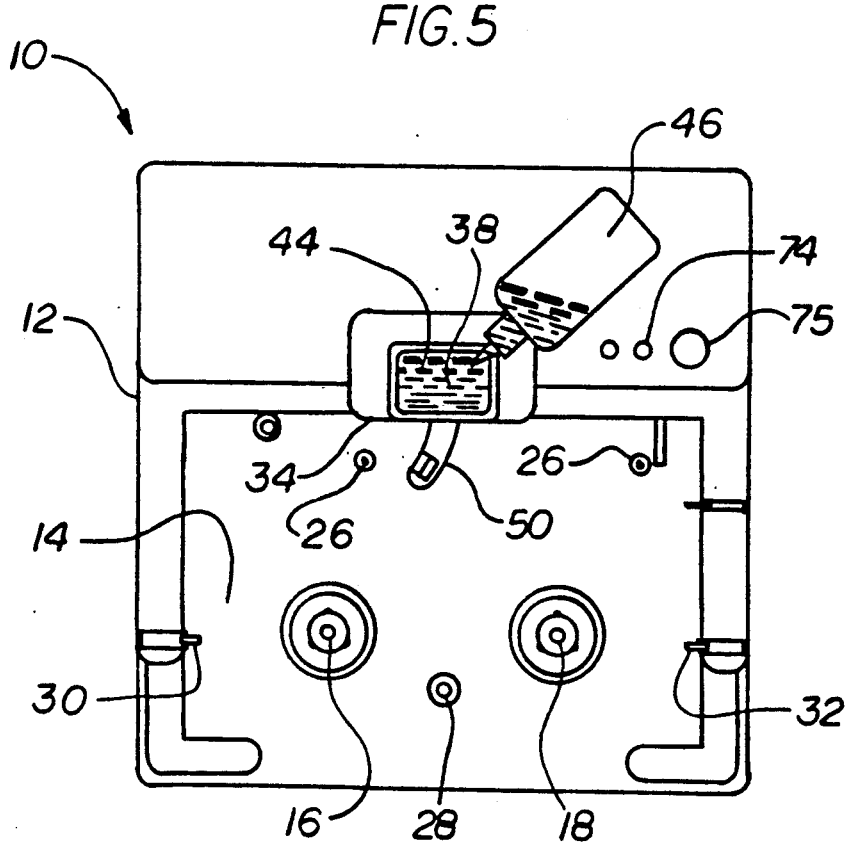
FIG. 6 is a top planned view of the apparatus showing fluid being inserted into the cleaning fluid reservoir.

As shown in FIG. 6, reservoir 38 is filled with a cleaning fluid 44 from a container 46. The fluid seeps down through hole 40 which communicates with an upper portion of first pad 34 for soaking the first pad with cleaning fluid. A preferred cleaning fluid is trichlorotrifluroethane. Such fluid is commonly used as a refrigerant and is commercially available from DuPont under their trademarks FREON TF and FREON 113. Upon placement of element 36 onto housing 12 and upon soaking of the first pad 34 with the tape cleaning fluid, the first pad 34 is positioned for wiping contact with the tape as it is advanced from reel to reel in a cartridge installed in the machine.

Figure 1:
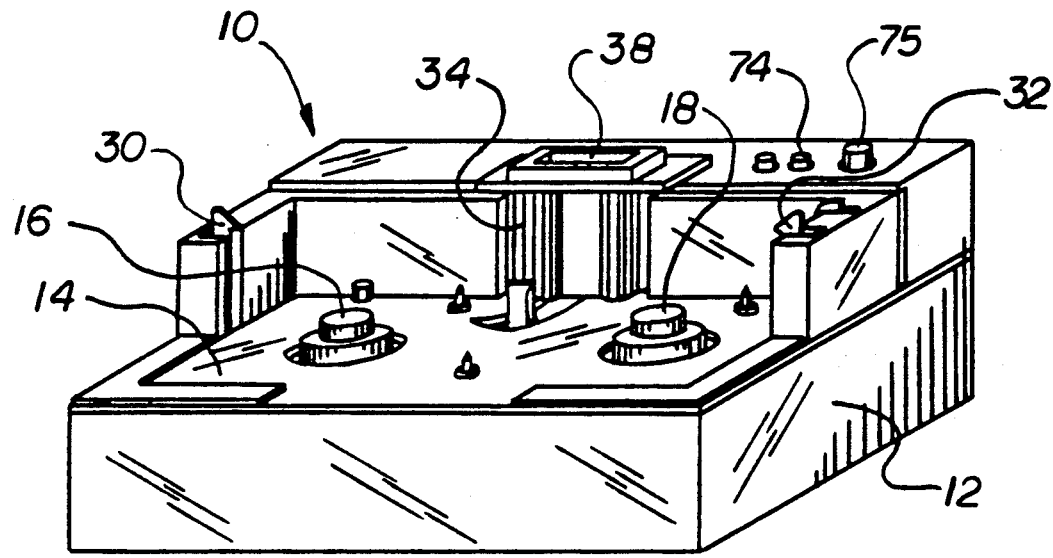
FIG. 1 is a perspective view of the electromagnetic tape cleaning apparatus of the invention.
Figure 2:
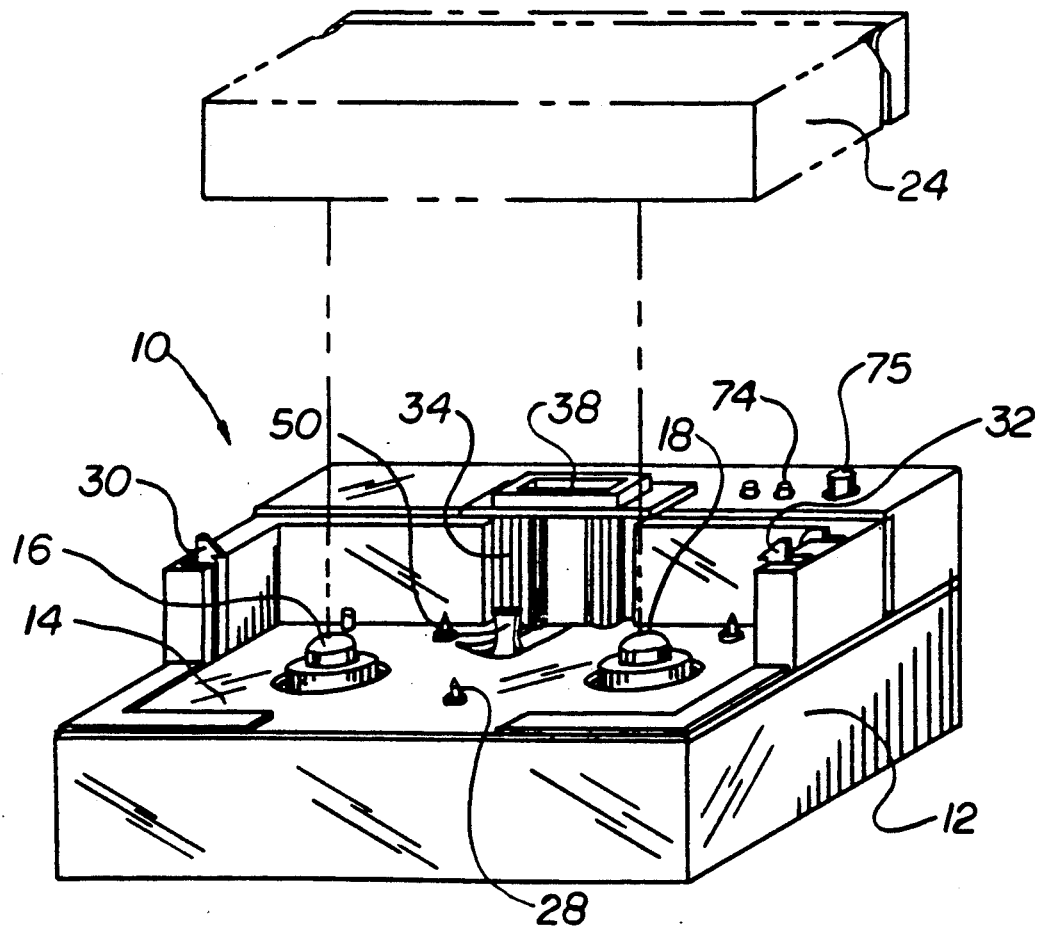
FIG. 2 is a perspective view of the apparatus with a VHS tape cartridge adapted for insertion thereon.
Figure 3:
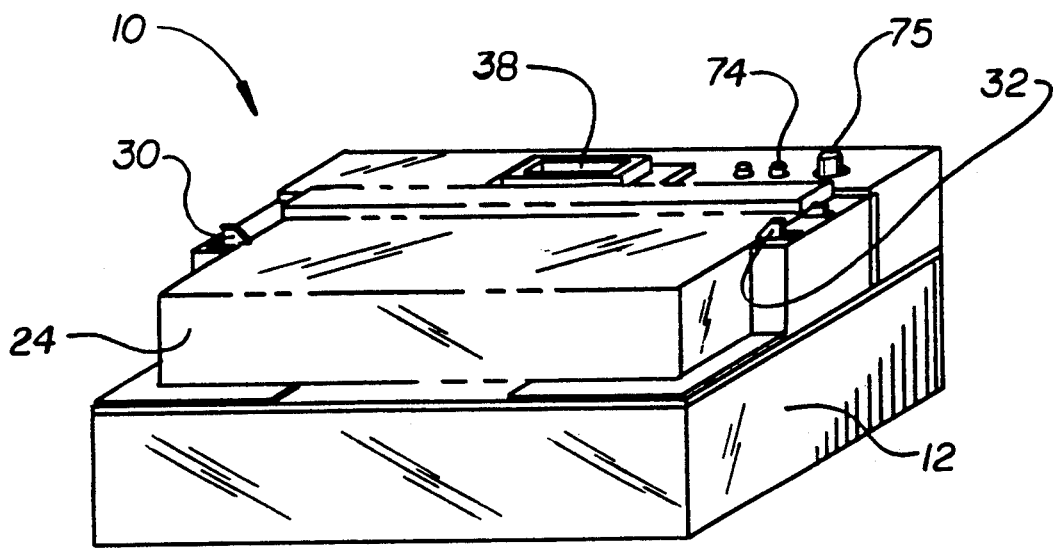
FIG. 3 is a perspective view of the apparatus with the VHS tape cartridge inserted thereon.
Figure 9:
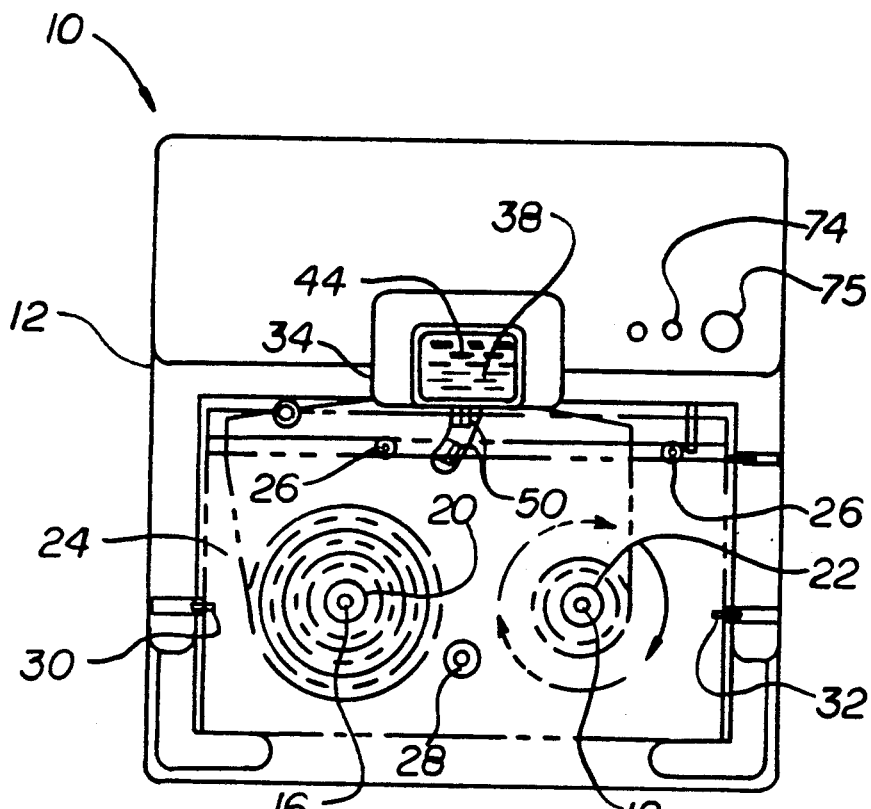
FIG. 9 is a top planned view of the apparatus showing the second pad moved from its loading position to its cleaning position.
Figure 10:
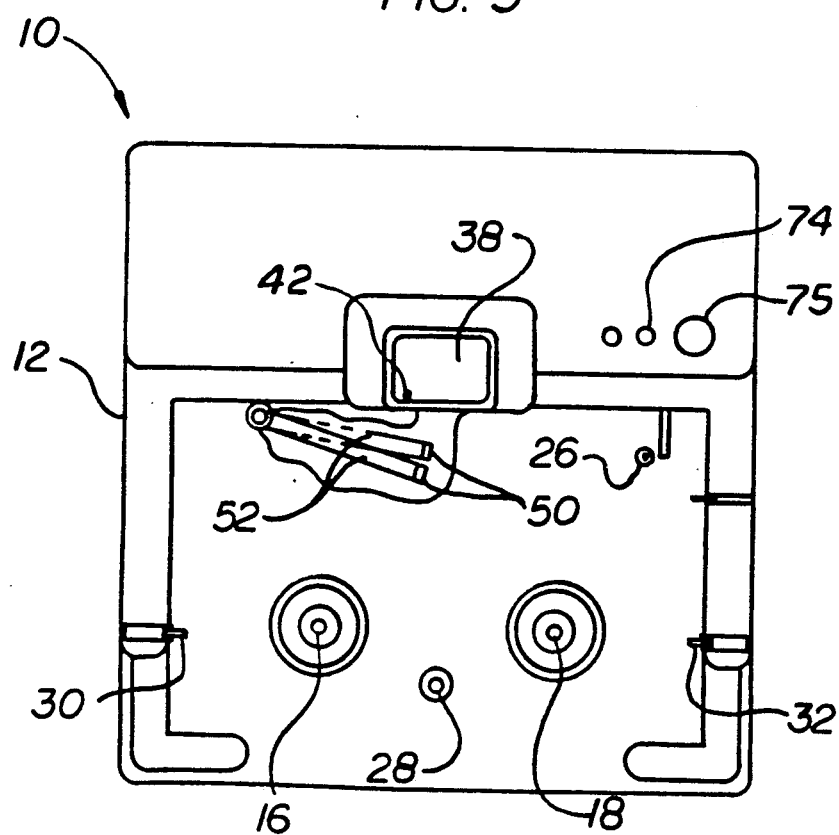
FIG. 10 is a top planned view with a portion of the housing broken away to show the pivotal support arm for the cleaner posts.

A second soft absorbent pad 48 is provided on an upright cleaning post 50 illustrated in FIGS. 2 and 9 as being movable from the dotted line loading position of FIG. 9 spaced apart from the first pad to the solid line cleaning position closely adjacent the first pad for wiping engagement with the backside of a tape being advanced between the pads. FIG. 10 illustrates that the post 50 is carried on a pivotal carrier arm 52 for back and forth pivotal movement between the loading and cleaning positions. An electrical solenoid 54 (FIG. 14) is operative to move the carrier arm to the cleaning position and a return spring may be provided to bias the arm back to its loading position.

Whereas the carrier arm 52 is shown as a pivotal member, it is apparent that post 50 could alternatively be supported on a linear slide block reciprocally movable within a track on surface 14 by actuation of a similar solenoid. The structure and support of the carrier arm are not critical to the invention rather, it is important that a means be provided for supporting the post 50 for movement between its loading and cleaning positions.

Figure 11:
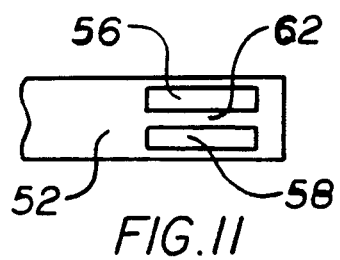
FIG. 11 is an enlarged top view of one end of the carrier arm showing the reversible positioning of the carrier post thereon.
Figure 13:
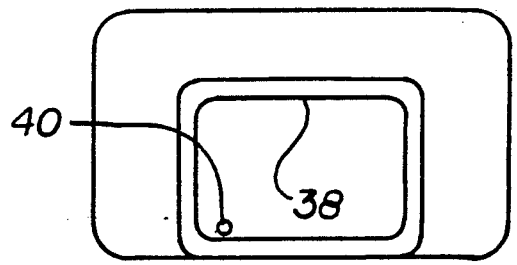
FIG. 13 is a top planned view of the fluid reservoir.
Figure 12:
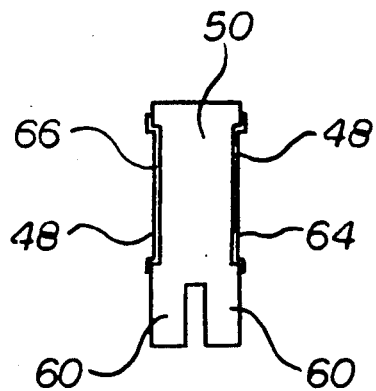
FIG. 12 is a side elevational view of the carrier posts.
Figure 12A:
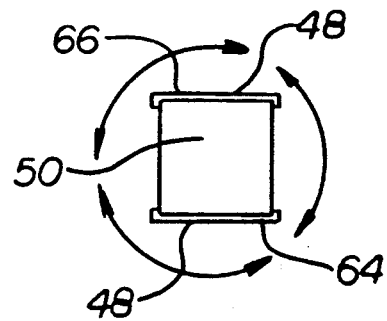
FIG. 12A is a top view of the carrier post of FIG. 12.

Referring to FIG. 11, the illustrated embodiment shows that the carrier arm 52 has a pair of slots 56 and 58 adjacent the free end for receiving a pair of depending snap fingers 60 on the lower end of post 50. It is preferred that the post be positively seated on the carrier which, on the illustrated embodiment, is accomplished by seating of the post on the carrier arm strip 62 between slots 56 and 58.

To prolong the useful life of the cleaner post 50, the second pad 48 is provided as two separate pads covering opposite first and second cleaner surfaces 64 and 66. When one pad becomes worn, it is simply necessary to lift the post from the carrier arm, rotate it one hundred eighty degrees (180°) as illustrated in FIG. 11, and reinsert it into the carrier arm so that the opposite cleaner surface faces the first pad 34.

Figure 14:
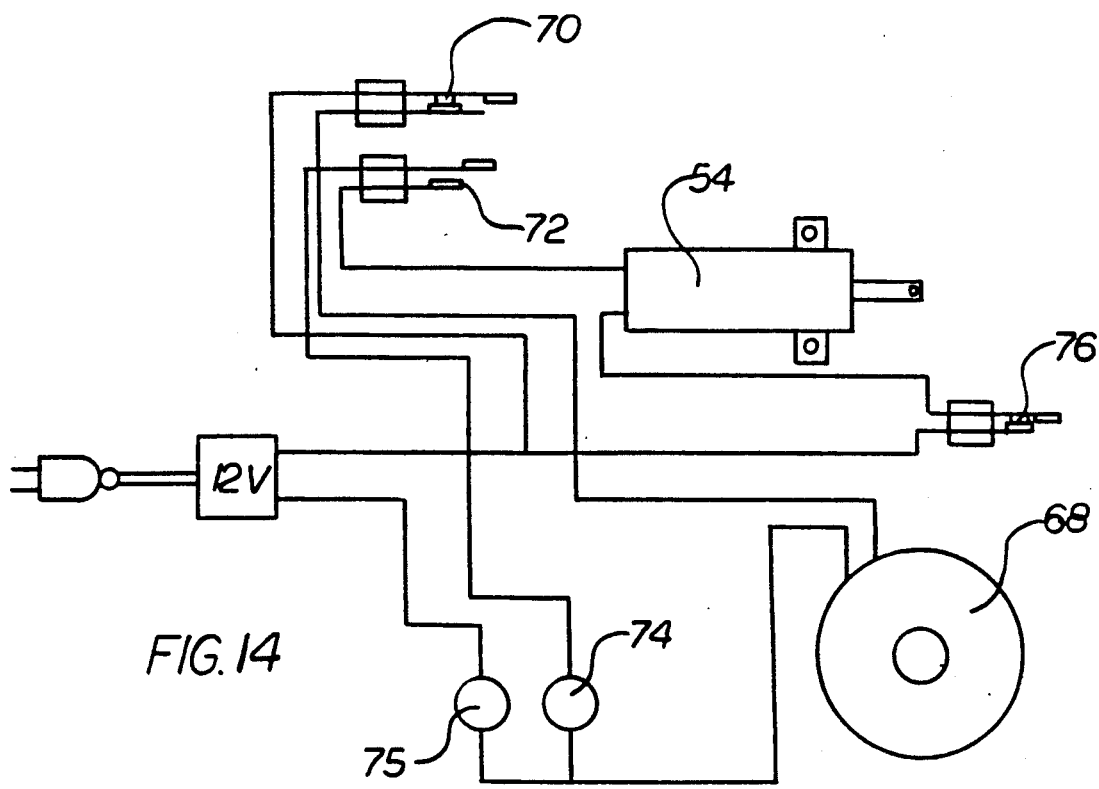
FIG. 14 is an electrical schematic circuit diagram for the apparatus.

FIG. 14 illustrates the electrical circuitry that controls the operation of the cleaning apparatus 10. Motor 68 is connected in drive relation to the right spindle shown in the drawings for advancing tape from the left spindle onto the right spindle during the cleaning cycle. Once a tape cartridge is properly installed into the machine on spindles 16 and 18, carrier arm 52 is moved toward the first pad 34 through a mechanical linkage. As soon as travel of the control arm toward the first pad starts, a motor control leaf switch 70 closes thus starting the motor 68. When the carrier arm reaches full travel to the cleaning position shown in solid lines in FIG. 9, a solenoid holding leaf switch 72 is made and the solenoid 54 locks the carrier arm in position. Thus the tape is advanced from one reel to the other between the first and second pads for a through cleaning of the entire length of the tape. The cleaning operation may be stopped at any time by a manual shut off switch 74. If the cleaning operation is not manually stopped, an automatic shutoff leaf switch 76 is positioned to sense tape tension for detecting when all tape has been wound from the left reel so as to open the switch and deenergize solenoid 54 so that the carrier arm may be retracted to its loading position by a return spring. The motor 68 continues to run during the travel of the carrier arm to its loading position to assure that any slack in the tape is taken up on the reel of the cartridge. After the carrier arm 52 has reached its rearward loading position the motor is shut off by leaf switch 70.

The drive connection between the motro and spindles is selected to make the speed of tape advancement across the cleaning pads effective for optimum cleaning of the tape. Experience and testing have shown that the best cleaning is accomplished when a T-120 tape takes between eight (8) and twelve (12) minutes to run its entire length.

Upon completion of the cleaning operation, the tape is removed from the apparatus, rewound and ready for the next usage. The first and second pads 34 and 48 are preferably made of a chamois material. This material affords a soft yet wearable and nonscratching absorbent surface. Known cloth or paper substitutes tend to leave tiny fibers on the tape which will cause further problems by plugging up the heads on a VCR. If excess dirt appears on the chamois pads, an eyedropper may be used to apply a cleaning fluid until the chamois pads are clean. It may be necessary to physically scrub the chamois pads with a swab.

Whereas the invention has been shown and described in connection with a preferred embodiment thereof, it is apparent that many modifications, substitutions and additions may be made which are within the intended broad scope of the appended claims.

Thus there has been shown and described an improved electromagnetic tape cleaner which accomplishes at least all the stated objects.

I claim:

1. An apparatus for cleaning electromagnetic tape wound onto dual reels of a tape cartridge, comprising
a housing,
a pair of spindles rotatably supported on said housing at positions for receiving respective reels of an electomagnetic tape cartridge thereon, power means drivingly connected to at least one of said spindles for causing the tape to be transferred from one reel to the other,
a first soft absorbent pad supported on said housing for wiping engagement with one side of a tape in a cartridge received on said spindles,
a cleaner post carrier supported on said housing for movement between a cleaning position adjacent said first pad and a loading position spaced further from said first pad,
a cleaner post having opposite first and second cleaner surfaces and being removably and reversably mounted on said carrier such that one of said cleaner surfaces faces said first pad,
a second soft absorbent pad on said first and second cleaner surfaces of said post whereby a tape on a cartridge on said spindle is sandwiched between said first and second pads upon movement of said carrier to the cleaning position thereof, a cleaning fluid reservoir on said housing, a liquid cleaning fluid in said reservoir, and fluid communication means between said reservoir and at least said first pad whereby said first pad is soaked with fluid from said reservoir for cleaning a tape advanced between said pads by said power means.

2. The apparatus of claim 1 wherein said first and second soft absorbent pads are made of chamois.

3. The apparatus of claim 2 further comprising an adhesive securing said first pad to said housing and said second pad to said cleaner post.

4. The apparatus of claim 1 wherein said apparatus is adapted to receive and clean VHS tape cartridges.

5. The apparatus of claim 1 wherein said cleaner post and carrier include detachable coacting snap fit fastening means.

6. The apparatus of claim 5 whereing said detachable snap fit fastening means comprises a pair of depending snap fingers on a lower end of said post and an opening in said carrier for receiving said snap fingers in either of opposite positions wherein either said first or second cleaner surface faces said first pad.

7. The apparatus of claim 1 further comprising a removable cover for said reservoir to minimize evaporation of fluid therefrom.

8. The apparatus of claim 1 wherein said fluid communication means comprises a conduit between said reservoir and first pad, said reservoir being situated on said housing for gravity flow of fluid from said reservoir to said first pad.

9. The apparatus of claim 1 further comprising second power means for moving said carrier from said loading position to said cleaning position.

10. The apparatus of claim 9 wherein said second power means comprises a solenoid.

11. The apparatus of claim 10 further comprising spring bias means urging said carrier toward the loading position thereof.

* * * * *